April 2, 1929.  J. GULLONG  1,707,909
AUTOMATIC SIGNALING APPARATUS
Filed Aug. 27, 1925  8 Sheets-Sheet 1
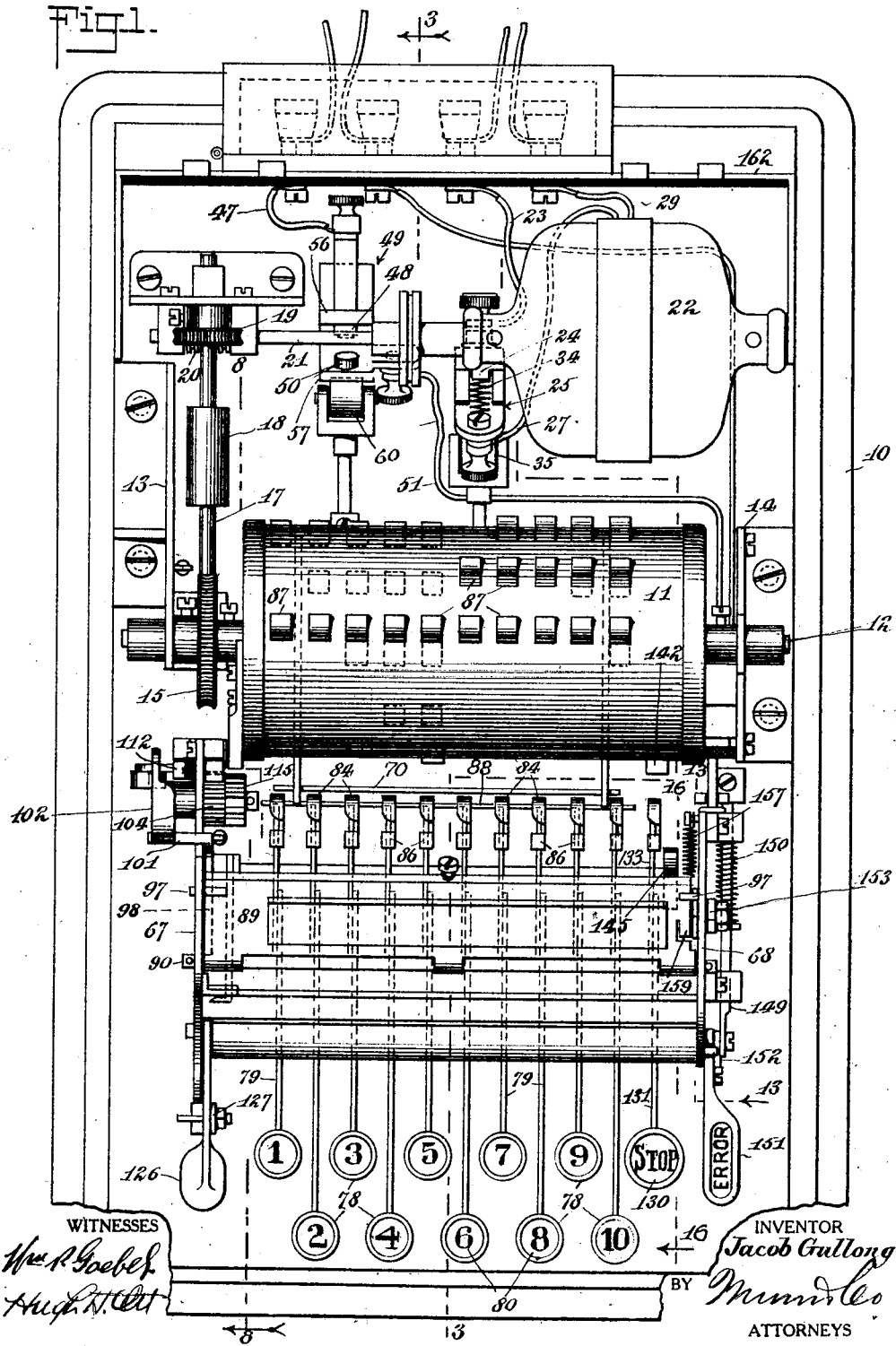

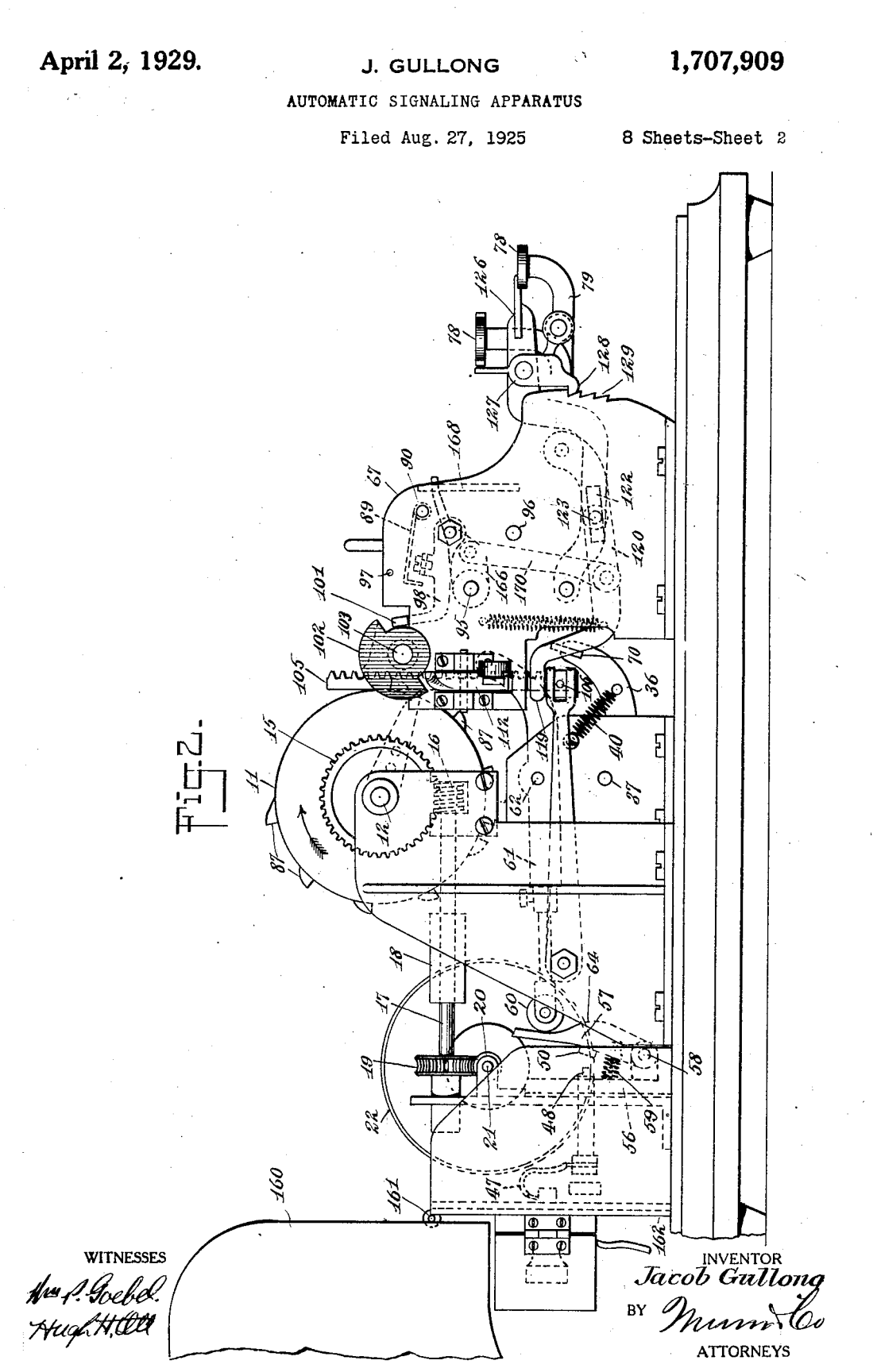

April 2, 1929.  J. GULLONG  1,707,909
AUTOMATIC SIGNALING APPARATUS
Filed Aug. 27, 1925  8 Sheets-Sheet 2

April 2, 1929.　　　　J. GULLONG　　　　1,707,909
AUTOMATIC SIGNALING APPARATUS
Filed Aug. 27, 1925　　　　8 Sheets-Sheet 3
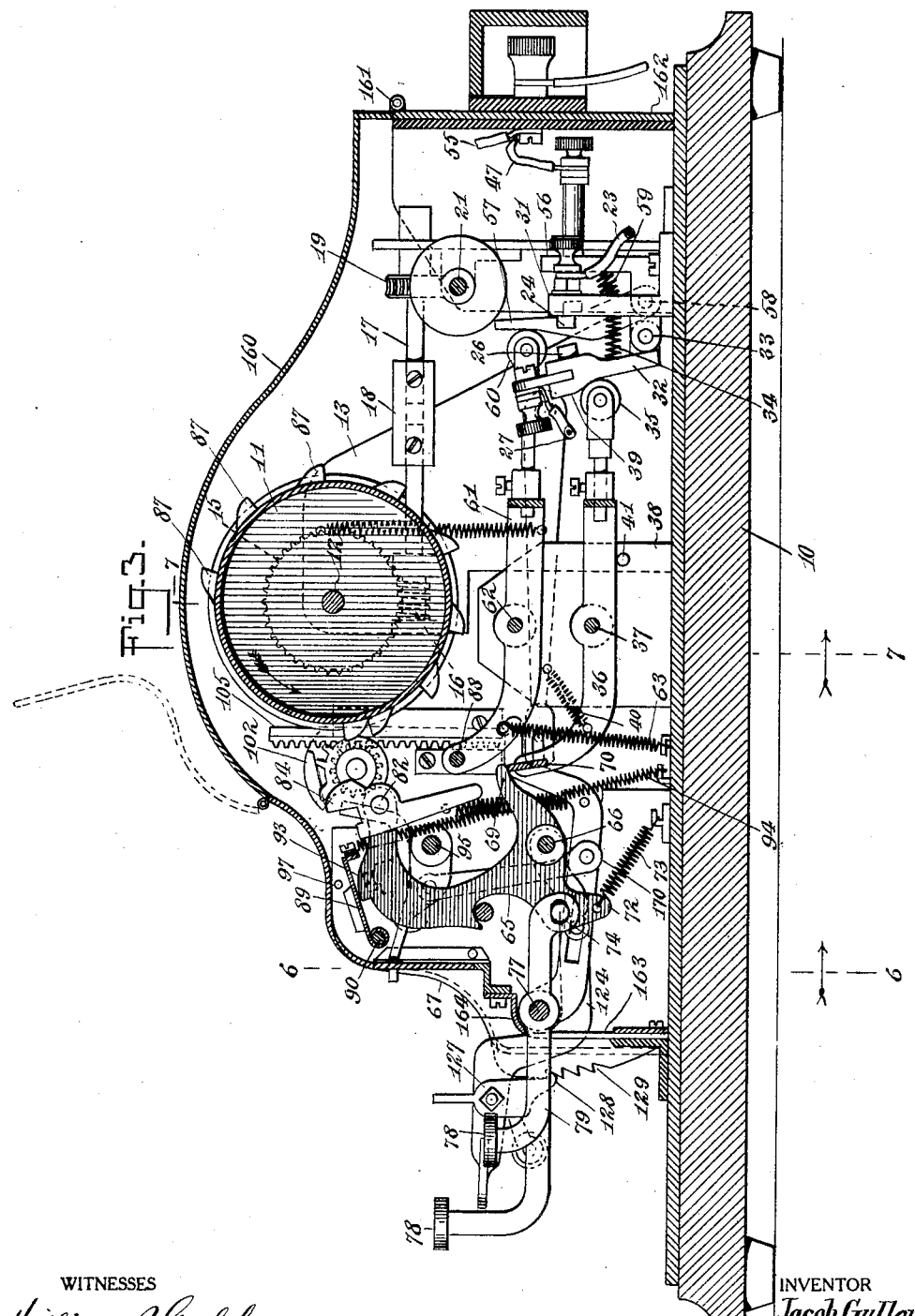
WITNESSES
INVENTOR
Jacob Gullong
BY
ATTORNEYS April 2, 1929.　　　　J. GULLONG　　　　1,707,909
AUTOMATIC SIGNALING APPARATUS
Filed Aug. 27, 1925　　　8 Sheets-Sheet 4
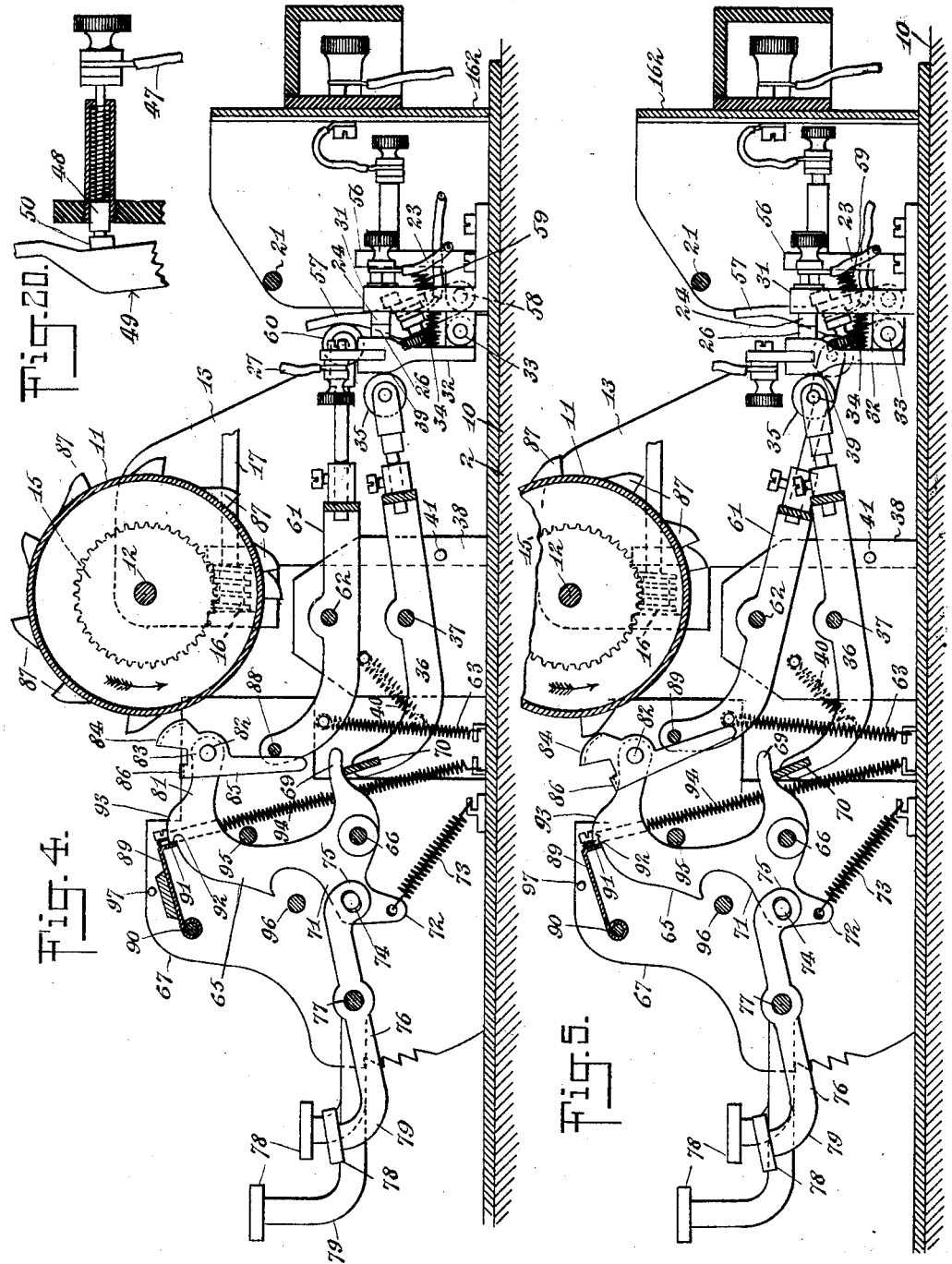
WITNESSES
William P. Goebel
Hugh H. Ott
INVENTOR
Jacob Gullong
BY Munn & Co
ATTORNEYS April 2, 1929.     J. GULLONG     1,707,909
AUTOMATIC SIGNALING APPARATUS
Filed Aug. 27, 1925     8 Sheets-Sheet 5

WITNESSES
William P. Goebel
Hugh H. Ott

INVENTOR
Jacob Gullong
BY Munn & Co
ATTORNEYS

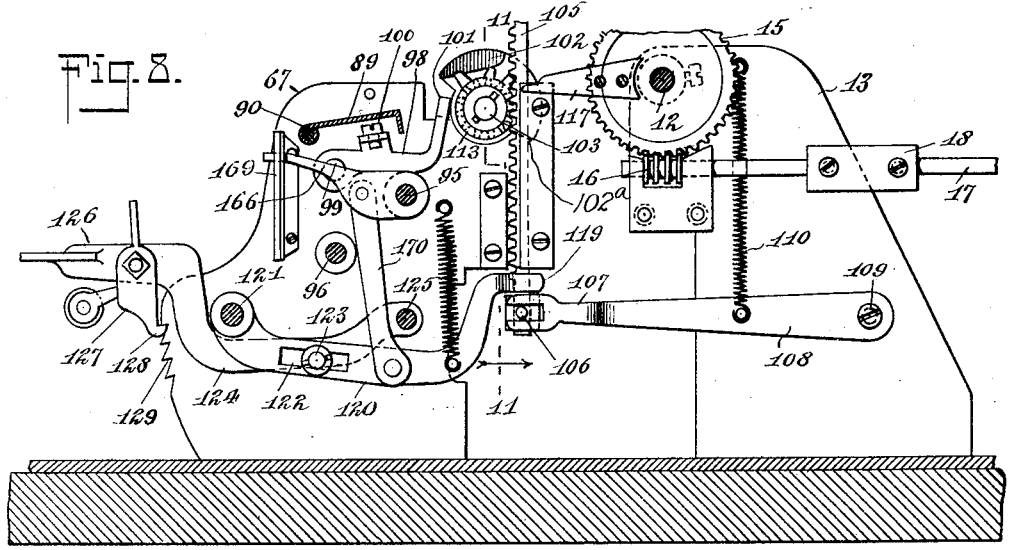

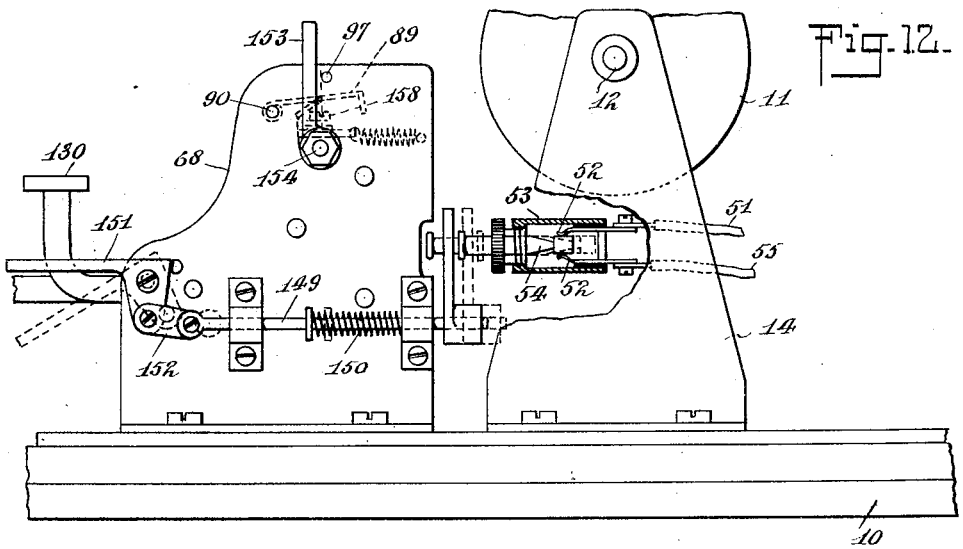
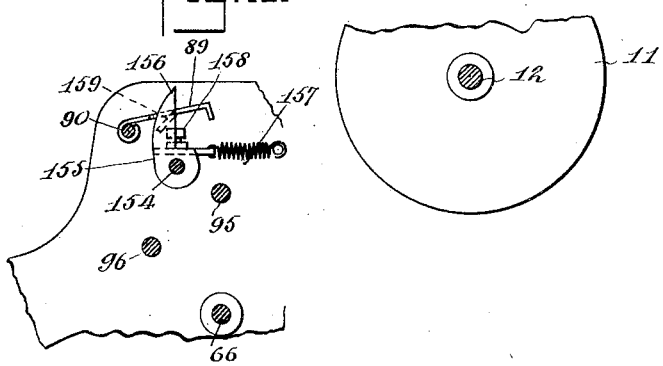
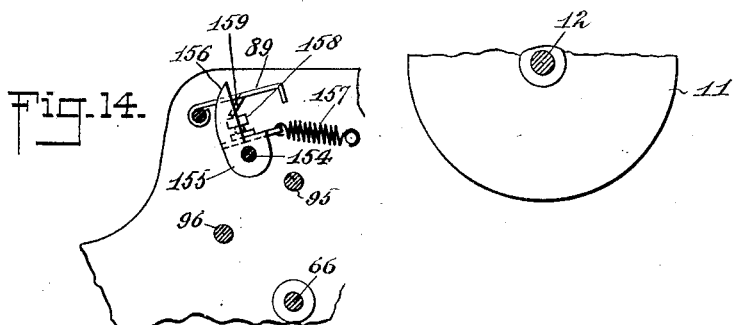
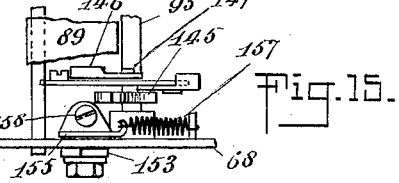

April 2, 1929.  J. GULLONG  1,707,909
AUTOMATIC SIGNALING APPARATUS
Filed Aug. 27, 1925  8 Sheets-Sheet 8
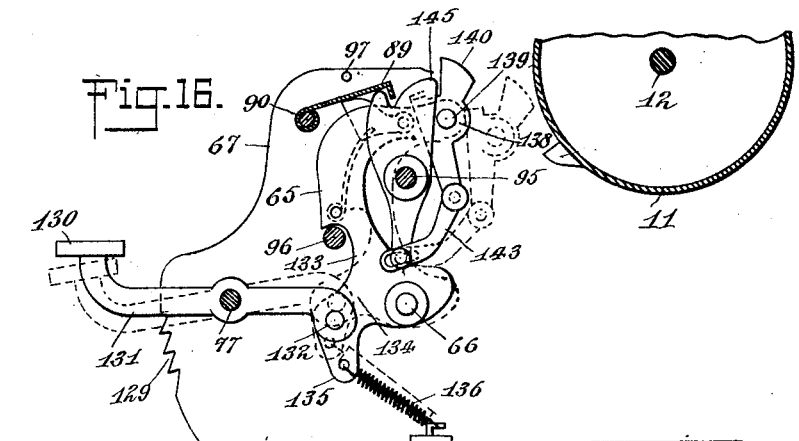
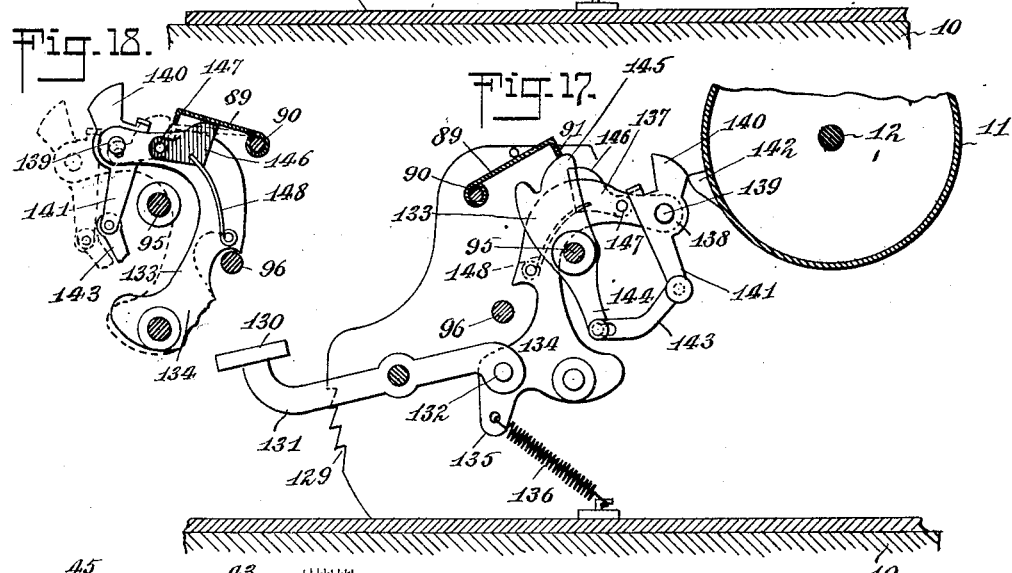
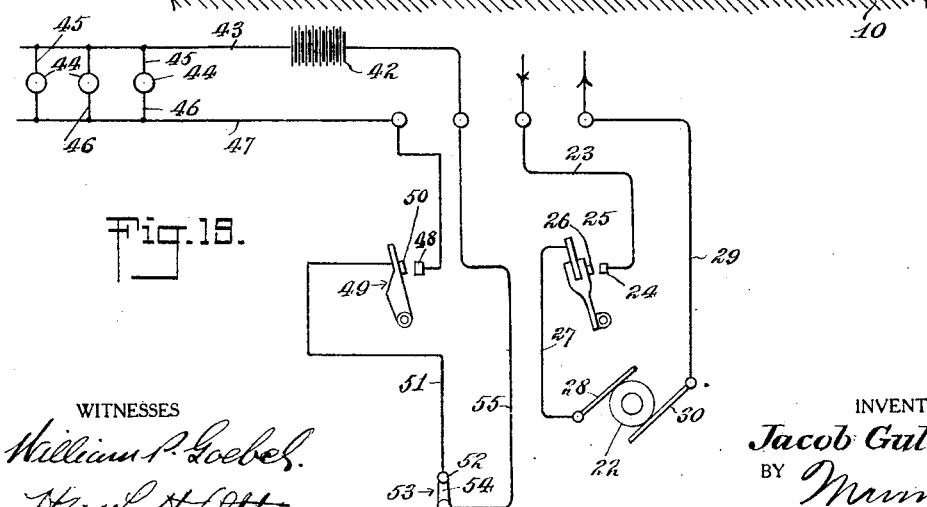
WITNESSES
INVENTOR
Jacob Gullong
BY
ATTORNEYS Patented Apr. 2, 1929.

1,707,909

UNITED STATES PATENT OFFICE.

JACOB GULLONG, OF SOUTH HADLEY FALLS, MASSACHUSETTS.

AUTOMATIC SIGNALING APPARATUS.

Application filed August 27, 1925. Serial No. 52,910.

This invention relates to signaling apparatus and comprehends a call signaling system including a central actuating apparatus by means of which distinguishable signals may be simultaneously given off from a number of widely separated signaling or annunciating devices controlled by the central apparatus.

In the larger stores, offices, shipyards, mines, or other commercial plants, which embody a number of widely scattered departments, it is essential in the performance of their duties, for the heads or executives of the departments to visit various points in their own or other departments and as it is not always feasible for them to leave a memorandum as to their whereabouts, there has arisen a long-felt need for an expeditious medium of calling these heads when their presence is urgently required at a central office.

It is, therefore, an object of the present invention to provide an improved calling and signaling system and apparatus including a central sending station having a signal actuating mechanism and annunciator or signal devices arranged at various points throughout the plant and its several departments controlled by the signal actuating mechanism at the central sending station for giving off audible, visual, or other signals, which are sure to be received by the head of a department irrespective of his location.

More particularly, the invention contemplates an electric signal-sending apparatus in the nature of a device provided with a keyboard controlling the disposition of circuit-closing elements in the path of movement of movable camming means so as to energize the various signaling or annunciating devices simultaneously.

The invention furthermore aims as an object to provide mechanism whereby the actuation of one key releases and renders a previously depressed key inactive so as to preclude the possibility of confusion in the signals emitted.

The invention further embodies means for selectively and automatically repeating the signals a predetermined number of times or continuously at the option of the operator together with manual means for respectively stopping the signaling mechanism at the end of a predetermined signal during the signaling operation, and means for opening the circuit in event of error whereby to render the signaling device or annunciators inaudible or invisible while permitting the mechanism to continue to function until the stopping point of the signals is reached, so as to prevent disruption of the mechanism and confusion in the signals when the device is subsequently operated.

With the above recited and other objects in view, which will be more readily apparent as the nature of the construction is better understood, reference is had to the accompanying drawings, in which Figure 1 is a plan view of the signal-sending apparatus with the cover or housing removed;

Fig. 2 is a side view with the cover or housing swung to an open position;

Fig. 3 is a longitudinal sectional view taken approximately on the line indicated at 3—3 in Fig. 1, with the cover in its closed relation;

Fig. 4 is a fragmentary longitudinal sectioal view similar to Fig. 3 with the cover removed and illustrating the actuation of one of the keys to close the motor circuit and to dispose the signaling-circuit-closing switch-actuating element in the path of movement of the camming means;

Fig. 5 is a similar view illustrating the camming means coacting with said element and closing the signaling circulit switch;

Fig. 8 is a sectional view taken approximately on the line 8—8 of Fig. 1, illustrating the repeat mechanism set for continuous operation;

Fig. 9 is a fragmentary enlarged similar view illustrating the repeat mechanism set for the repeat of a signal;

Fig. 10 is a similar view illustrating the operation thereof;

Fig. 11 is a transverse sectional view taken approximately on the line 11—11 of Fig. 8;

Fig. 12 is a detail fragmentary side elevation with parts in section as viewed from the right of the machine and particularly illustrating the signaling circuit breaking device employed in event of an error;

Fig. 13 is a fragmentary longitudinal sectional view taken approximately on the line 13—13 of Fig. 1, illustrating the instantaneous stopping means in normal position;

Fig. 14 is a similar view illustrating the stopping device actuated;

Fig. 15 is a fragmentary plan view of the instantaneous stopping device;

Fig. 16 is a fragmentary longitudinal sectional view taken approximately on the line 16—16 of Fig. 1, illustrating in full and dotted lines the normal and shifted positions of the stop key and associated parts;

Fig. 17 is a similar view thereof, with the parts shifted and engaged by the stop cam;

Fig. 18 is a similar fragmentary reversed view of the stop-key-actuated stopping mechanism;

Fig. 19 is a view of the wiring diagram;

Fig. 20 is an enlarged fragmentary detail sectional view of the circuit closer for the signaling circuit.

Figure 6:
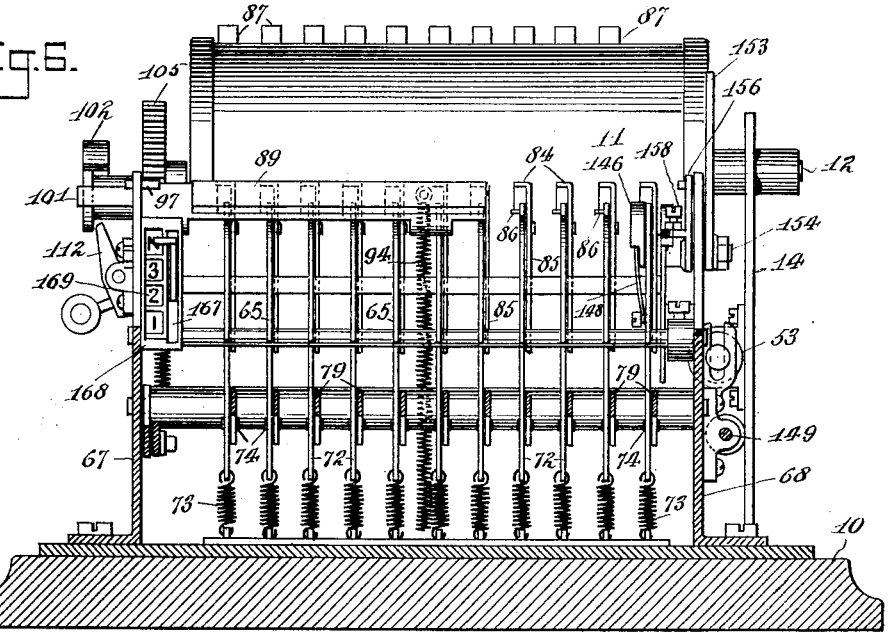
Fig. 6 is a transverse sectional view taken approximately on the line 6—6 of Fig. 3.
Figure 7:
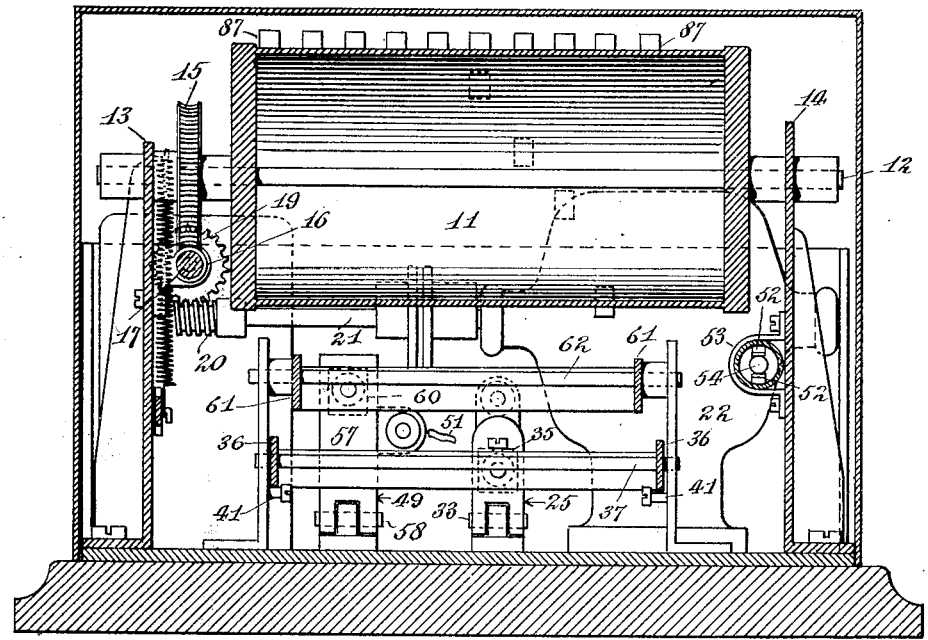
Fig. 7 is a similar view taken approximately on the line 7—7 of Fig. 3.

Referring to the drawings by characters of reference, the signal-sending apparatus comprises a base 10 from which is supported for rotation, a drum 11 secured to a shaft 12 journaled in side bearing brackets or standards 13 and 14. The drum shaft 12 has keyed or secured thereto a worm wheel 15 with which a worm 16 meshes, said worm being secured to a worm shaft 17 extending through a bearing 18. The worm shaft 17 has secured or keyed thereto at its rear end, a worm wheel 19 with which a worm 20 meshes, the said worm 20 being secured or keyed to the motor shaft 21 of a motor 22 mounted on the base 10. From the foregoing it will be seen that when the motor is energized, the drum 11 will be driven and rotated in the direction indicated by the arrows in the various figures.

The motor is included in a motor circuit (see Fig. 19) in which 23 is a circuit wire leading from a source of supply to a stationary contact 24 of a switch 25, which switch includes a movable contact 26 connected by a circuit wire 27 to one of the brushes 28 on the motor. The motor circuit also includes a circuit wire 29 leading from the opposite pole of the source of supply to the brush 30 of the motor so that when the switch 25 is closed and the circuit is completed, the motor will operate to rotate the drum 11. The stationary contact element 24 (see Fig. 3) is mounted on a bracket 31 supported from the base and the movable contact element 26 is mounted on an arm 32 which is pivoted or fulcrumed at 33 on the bracket 31. A spring or other suitable means 34 is interposed between the bracket 31 and arm 32 for normally effecting a relative separation of the movable contact element with respect to the stationary contact element so that the motor circuit is normally opened.

The means for swinging the arm 32 to bring the movable contact element 26 into contacting engagement with the stationary contact element 24 to close the switch 25 and the motor circuit against the action of the spring 34, consists of a pressure roller 35 carried on a frame 36 which is pivoted on a transverse shaft 37 mounted in laterally spaced bearing brackets 38 for vertical rocking movement whereby the pressure roller upon upward movement engages the cam face 39 of the arm 32. The frame 36 is normally swung downwardly at its rear end, by means of a spring or equivalent device, 40, which is attached to the frame and one of the brackets 38. Stops 41 carried by the brackets 38 engage the under side of the frame 36 to limit the downward movement thereof under the action of the spring 40.

The signaling circuit (see Fig. 19) includes a source of supply, such as a battery 42, from one pole of which a circuit wire 43 leads to a plurality of annunciating or signaling devices 44, through branch wires 45. The signaling devices 44 may be audible, such as bells, or visual, such as lights, without in any way departing from the general idea of the invention, and from said annunciating or signaling devices 44, branch circuit wires 46 lead to a circuit wire 47, which is connected with the stationary contact element 48 of a switch 49. The switch 49 includes a movable contact element 50 connected by a circuit wire 51 with the stationary contact element 52 of a switch 53 having a movable contact element 54 which is in turn connected by a return circuit wire 55 with the opposite pole of the battery or source of power 42. The stationary contact element 48 of the switch 49 is carried by a bracket 56 and the movable contact 50 is carried by an arm 57 pivoted at 58 to the bracket 56. A coil contractile spring or other equivalent means 59 is interposed between the arm 57 and the bracket 56 for normally maintaining the contact elements 48 and 50 out of contact. In order to provide means for swinging the arm 57 against the action of the spring 59 to a position to engage the contacts 48 and 50, a pressure roller 60 is carried by a vertical rockable frame 61 which is fulcrumed on a transverse shaft 62 mounted in the bearing brackets 38. A spring or other equivalent device 63 is connected to the forward end of the frame and to the base at its opposite ends for normally exerting a tension in a direction to rock the rear end carrying the pressure roller 60 upwardly. The arm 57 is provided with a cam face 64 with which the pressure roller 60 coacts upon downward movement to swing the arm against the action of the spring 59 rearwardly to engage the contacts 48 and 50 for closing the switch 49 and the signaling circuit to energize or actuate the signaling or annunciator devices 44.

The mechanism for closing the motor and signal circuits to send forth the signals, includes a plurality of laterally spaced jacks or rock levers 65 fulcrumed upon a transverse shaft 66 mounted in bearing plates 67 and 68. Each jack or rock lever is of substantially C-shape having a rearwardly projecting lower terminal 69, the said terminals directly overlying the front frame rail 70 of the frame 36. The jacks 65 are also provided with forwardly extending tails 71, the lower extremities 72 of which are connected by springs or equivalent means 73 to the base, whereby to normally swing the lower terminals 69 upwardly and bodies of the jacks forwardly. The tails 71 each have pivotally connected thereto, as at 74, one extremity 75 of a key lever 76, which key levers are in turn fulcrumed upon a transverse shaft 77 mounted at its opposite ends in the bearing plates 67 and 68, the key levers being provided with finger-engaging keys 78 at their forward upturned ends 79, which key levers are provided with suitable indicia 80.

From the foregoing it will be seen that when any one of the keys 78 is depressed, the rear extremity 75 is raised to swing the tail 71 of its jack upwardly against the action of the spring 73, thereby depressing the lower terminal 69 of the jack. This effects downward rocking movement of the forward end of the frame 36, thereby effecting upward movement of the pressure roller 35 to cause the same through its engagement with the cam face 39 of the arm 32, to close the motor circuit resulting in rotary motion of the drum 11.

The upper rearwardly projecting terminal 81 of each jack has pivoted thereto at 82, a lever 83 having an upwardly and rearwardly projecting cam head 84 and a depending finger 85. The lever is further provided with a laterally bent stop lug 86. The drum 11 is provided with laterally spaced circumferentially disposed sets of cam lugs 87 adapted to selectively co-operate with the cam heads 84 when the jacks are swung rearwardly, by depressing the keys 78, whereby to swing the depending finger 85 of the lever 83 rearwardly to engage the transverse cross bar 88 of the frame 61 to rock its front end upwardly against the action of the spring 63. This movement rocks the rear end downwardly, thus moving the pressure roller 60 in a direction to engage the cam face 64 of the lever 57 to rock the lever 57 rearwardly for closing the signaling circuit.

In order to hold the key lever 76 which has been depressed in a depressed condition until released and thereby retain the jack connected therewith in a rearward shifted position, a latch plate 89 is fulcrumed upon a transverse shaft 90, said latch plate having a downturned latching nose 91 at its free rear end engageable with a keeper shoulder 92 formed on each jack. The upper rearwardly projecting terminal 81 of each jack 65 is formed with a cam face 93, which merges into the keeper shoulder 92 so that rearward swinging of the jack effects the camming of the latch plate 89 upwardly against the action of a spring 94 which normally tends to swing said latch plate downwardly. The jacks 65 are limited against rearward swinging movement by the cross rod 95 and against forward swinging movement under the action of the springs 73 by the cross rod 96. The latch plate 89 is limited against upward swinging movement by stop pins 97. The stop pins 97, the rods 95 and 96 and the shaft 90 are all mounted in the bearing plates 67 and 68.

It is of course obvious that when a key is depressed and the motor circuit is closed, the drum 11 will continue to rotate and the jack 65 will be maintained in its rearwardly shifted position to dispose the cam head 84 in the path of movement of the cam lugs 87. In order, however, to provide means for automatically breaking the motor circuit and releasing the rearwardly shifted jack to stop the motor after one or more complete rotations of the drum, a stopping mechanism is provided, which includes a lever 98 (see Figs. 8 to 11) fulcrumed at 99 to the inner side of the bearing plate 67, said lever having an adjustable engaging element 100 underlying the latch plate 89. The lever 98 is provided with a laterally outwardly projecting terminal 101 (see Fig. 2) which is disposed in the path of movement of a rotatory lifter 102 secured to a shaft 103 which extends through and has bearing in the bearing plate 67. A pinion 104 is secured to the shaft 103 and said pinion meshes with a vertically movable rack bar 105, which rack bar is connected at its lower end by a pin 106 to the forked terminal 107 of a lever 108 pivoted at 109 in the side bearing bracket 13. A spring 110 connected respectively at its opposite ends to the lever 108 and the side bearing bracket 13, tends normally to effect an upward movement of the forked end 107 of the lever and a corresponding upward movement of the rack bar 105. The rack bar 105 is provided on its outer side face with a pair of vertically disposed ratchet teeth 111 with which a gravity pawl 112 co-operates to hold the rack bar downwardly against the action and tendency of the spring 110 to raise the same. A mutilated gear 113 having teeth 114, 115 and 116 is secured or keyed on the shaft 103 and a radially disposed arm 117 projects radially from and is secured to the end of the drum 11 for successively engaging the teeth 114, 115 and 116. The lower end of the rack bar is provided with an enlarged head 118 over which the upwardly offset forked rear terminal 119 (see Fig. 8) of a lever 120 engages. The lever 120 is pivoted as at 121 to the bearing plate 67 and is provided with a slot 122 which receives a pin 123 projecting from a manipulating lever 124 pivoted at its rear end at 125 to the bearing plate 67. The upwardly offset forwardly projecting manipulating terminal 126 of said lever has pivoted thereto a gravity keeper pawl 127, the nose 128 of which co-operates with the ratchet teeth 129 on the forward edge of the bearing plate 67. This manipulating lever 124 through its pin-and-slot connection with the lever 120, affords a medium for moving the rack bar 105 to a position for setting the mutilated gear 113 from the keyboard of the device. An auxiliary spring 120ᵃ is connected with the lever 120 adjacent its upwardly offset forked rear end 119 to assist the spring 110 in its action. If the manipulating lever be depressed to the fullest extent to engage the nose 128 of the gravity pawl 127 with the lowermost ratchet tooth 129, the rack bar will be moved downwardly and the mutilated gear turned thereby until the longest tooth 116 is disposed in a position to be engaged by the radial arm 117 after one complete revolution of the drum. This engagement of the arm 117 with the ratchet tooth 116 effects a further depression or movement of the rack bar 105 downwardly so that the smooth surface of the rack bar above the ratchet teeth 111 engages with the gravity pawl 112 and releases the same from the rack bar which allows the spring 110 to suddenly effect upward movement of the rack bar before the gravity pawl re-engages with the ratchet teeth. This upward movement of the rack bar rotating the shaft 103 in a counterclockwise direction in Figs. 8, 9 and 10, causes the rotatory lifter 102 which is secured to the shaft 103 to engage with the lateral outwardly projecting terminal 101 of the lever 98, to move the same whereby the adjustable engaging element 100 underlying the latch plate 89 lifts said latch plate and releases the depressed key and jack. Upon its release the said jack and key are moved to their normal position so that the motor circuit is broken and signaling by the device is brought to a stop. If set to engage the nose 128 with the next-to-the-lowest ratchet tooth 129, the tooth 115 will be disposed in a position to be engaged by the radial arm 117 so that the first revolution will effect the engagement of the arm 117 with the tooth 115, to turn the mutilated gear 113 and shaft 103 a portion of a revolution to bring the longer tooth 116 into a position whereby the second revolution of the drum will effect the engagement of the arm 117 with the tooth 116, which will bring the rotatory lifter into engagement with the lateral outwardly projecting terminal 101 of the lever 98 to lift the same into engagement with the latch plate 89 to release the latch plate and cause a cutting off of the motor. If the nose 128 is engaged with the next adjacent ratchet tooth 129, it is obvious that the stop mechanism will function after three revolutions of the drum. If the nose 128 is engaged in the uppermost ratchet tooth 129, the rack bar will be raised a sufficient distance to dispose the teeth of the mutilated gear 113 out of the path of movement of the arm 117, so that the automatic stopping mechanism is rendered neutral and hence the device will continue to operate to repeat the signals until stopped by manually stopping means in the nature of a stop key 130. To set the revolution controlling means for one revolution only of the drum 11, the manipulating terminal 126 of the manipulating lever 124 is depressed until the nose 128 of the gravity pawl 127 engages the lowest ratchet tooth 129. The depression of the lever 124 depresses the lever 120 through its pin-and-slot connection 123 and 122, and consequently swings downwardly the upwardly offset forked rear terminal 119, thereby moving the rack bar 105 downwardly. The downward movement of the rack bar 105 engaging with the teeth of the pinion 104 which is secured to the shaft 103, turns the shaft 103 in a clockwise direction as viewed in Figs. 8, 9 and 10. This turning movement of the shaft 103 turns therewith in the same direction, the mutilated gear 113 until the longer tooth 116 is disposed in a position to be engaged by the radially disposed arm 117 which projects from and is secured to the end of the drum 11. As the rack bar 105 is moved downwardly, the gravity pawl 112 is ratcheted over the pair of teeth 111 in the side of the rack bar so that its nose or bearing point engages with the uppermost tooth 111. This turning movement of the shaft 103 also turns therewith in a clockwise direction as illustrated in Figs. 8, 9 and 10, the rotary lifter element 102, to approximately the position illustrated in Fig. 10 so that the shoulder 102ᵃ is disposed directly below the outwardly projecting terminal 101 of the lever 98. It thus follows that when the drum reaches approximately one complete revolution in a counterclockwise direction, the arm 117 will engage with the tooth 116 to partially turn the shaft 102 further in a clockwise direction, thus causing the shoulder 102ᵃ of the rotary lifter 102 to engage under and raise the outwardly-projecting terminal 101 of the lever 98. This lifts the lever 98 and causes the adjustable engaging element 100 underlying the latch plate to engage and lift the latch plate. It is obvious that the shaft 103 and its pinion 104 are free to be turned by the arm 117 in this further clockwise direction because the rack bar is capable of a further downward movement against the action of the spring 110 and it follows also that after arm 117 has passed over the tooth 116, the rack bar moving downwardly therewith will cam the nose of the latch 112 on to the side of the rack bar above the uppermost tooth 111 and the spring 110 acting quicker than the gravity pawl will snap the rack bar upwardly to the same position it occupied before the arm 117 engaged the tooth 116, namely, until the enlarged head 118 engages the forked terminal 119. This upward movement effects a retrograde or counterclockwise partial turning movement of the shaft 103 through the pinion 104 and a similar counterclockwise turning movement of the mutilated gear 113 and the rotary lifter 102 so that upon the next manipulation of one of the keys 78, the signaling drum 11 will turn one complete revolution and be stopped in the same manner as heretofore described. So long as the lever 124 is retained in the set position described for a single revolution of the revolution controlling means, each manipulation of the machine will cause the drum to turn one complete revolution and stop.

To set the revolution controlling means for three revolutions, the manipulating lever 124 is depressed from the position shown in Fig. 8 to a point where the nose 128 of the gravity latch 127 engages the next adjacent lower tooth 129. In this position the pin-and-slot connection 123 and 122 will swing the forked upwardly offset rear terminal 119 of the lever 120 downwardly a less distance than when the same is set for one revolution. This downward movement moves the rack bar 105 down to a point where the terminal or nose of the gravity latch 112 engages the side of the rack bar 105 immediately below the first ratchet tooth 111. This movement downwardly of the rack bar 105 turns the shaft 103 in a clockwise direction to a point where the first or lowermost tooth 114 is in a position to be engaged by the arm 117 as the signaling drum 111 approximately completes the first revolution. This engagement turns the shaft 103 further in a clockwise direction and depresses the rack bar until the nose or terminal of the gravity latch 112 engages in the lowermost ratchet tooth 111 on the side of the rack bar 105, thus holding the same down. At the same time, the mutilated gear has been turned further in a clockwise direction to bring the second or intermediate tooth 115 thereof to a position to be engaged by the arm 117 when the second revolution of the signaling drum is approximately completed so that the shaft 103 is again turned a further distance in a clockwise direction and the rack bar depressed until the nose of the gravity latch 112 engages with the uppermost ratchet tooth 111. This turning movement of the shaft now disposes the uppermost tooth 116 of the mutilated gear into a position to be engaged by the arm 117 when the signaling drum approximately completes its third revolution, at which time through its engagement with the tooth 116, the arm 117 will cause the shaft 103 to be further turned in a clockwise direction to bring the shoulder 102$^a$ of the rotary lifter into engagement with the laterally outwardly projecting terminal 101 of the lever 98 to raise the lever and again lift the latch plate 89. During this engagement of the tooth 116 it is obvious that the rack bar 105 will be depressed so that the nose of the gravity latch 112 is engaged with the side of the rack bar 105 above the uppermost tooth 111, and the spring 110, which functions more rapidly than the gravity pawl 112, will move the rack bar upwardly to its original set position with the ratchet teeth 111 disposed above the nose of the gravity pawl 112 or substantially in the position illustrated in Fig. 11. This resets the manipulating gear as well as the rotary lifter and the revolution controlling means will remain in its set position for stoppage after three revolutions of the signaling drum until manually reset to another position.

The stop key 130, which is more clearly illustrated in Figs. 16 and 17, is attached to a stop-key lever 131 of substantially identical construction to the key levers 76, the same being fulcrumed or pivoted on the transverse shaft 77 and operatively connected at 132 to the stop-key jack 133 which is of substantially identical construction to the jack 65, being pivoted or fulcrumed upon the transverse shaft 66 and having a forwardly projecting tail 134 to which the key lever 131 is connected and a depending extremity 135 from the tail connected by a spring 136 to the base 10. The stop-key jack 133, as illustrated in Figs. 16, 17 and 18, is formed with an upper rearwardly projecting terminal 137 to which a lever 138 is pivoted at 139, said lever being provided with a cam head 140 and a depending finger 141. It will, however, be noted that the stop key 130 and the jack 133 are disposed at one side of the cross bar 88 and the front frame rail 70 so that neither the stop-key jack nor the finger 141 functions in connection with said cross bar and rail. The cam head 140 is designed to be operated upon by the stop cam lug 142 on the drum 11, when the stop key 130 is depressed to swing the finger 141 rearwardly. The finger 141 is connected at its lower end by a connecting rod 143 with the downwardly projecting arm 144 of the latch plate lifter cam 145 which is fulcrumed upon the cross rod 95 so that the said cam 145 lifts the latch plate 89 and releases the key 78 which has been depressed after a signal is completed. The stop-key jack 133 is held in a rearward shifted position by means of a retaining pawl 146, which is pivoted at 147 on the jack 133 and is normally swung to an active engaging position with the latch nose 91 by a spring 148. From this construction it will be seen that if the automatic stopping means is set at neutral so that the device will operate continuously, after the desired number of signals have been rendered, the operator depresses the stop key 130, which upon completion of the signal being rendered will bring the device to a stop and reset the depressed key 80 as well as the stop key 130.

In order to provide means for breaking the signal circuit in event of an error on the part of the operator where the wrong key 80 has been depressed, the switch 53 (see Fig. 12) is provided which includes the stationary and movable contacts 52 and 54. The movable contact element 54 is connected to a slide rod 149, which is normally moved in a direction to complete the signal circuit by a spring 150. An actuating key 151 is connected therewith by a link 152 for moving the slide rod in a direction to break the circuit in event of an error, while the motor circuit is permitted to remain in a closed condition. At the same time, however, the operator will depress the stop key so that when the drum has completed a revolution, it will be brought to a stop in the correct position for the starting of a new signal when a subsequent correct key 80 is depressed. The operator, however, must maintain the actuating key 151 depressed to hold the signal circuit in open condition until the drum has come to a stop.

In certain instances it may be found desirable to release the latch plate instantaneously and to this end a latch plate releasing lever 153 is pivoted on the bearing plate 68. This lever 153 is connected to a shaft 154 provided with a head 155 secured thereto at the inner side of the plate 68 and formed with a radial stop arm 156 which engages the stop pin 97. The head is connected by a spring 157 to the bearing plate 68 for normally swinging the lever to an inactive position. The head has connected thereto a radially projecting adjustable member 158 which cooperates with a depressed lug 159 on the latch plate 89, so that when the lever 153 is swung in a forward direction against the action of the spring 157, the member 158 engages the depressed lug 159 to raise and release the latch plate 89.

In practice, the cam lugs 87 are disposed on the periphery of the drum in correlation to the cam heads of the jacks, so that the depression of the keys 80 after effecting the closing of the motor circuit to stop the drum, will give off a predetermined signal by the engagement of the cam lugs with the cam head.

The construction and arrangement of the jacks are such that in event of depression of two keys 80 successively, the first key and its jack will be released upon depression of the second key for the reason that the cam face 93 of the jack of the second key depressed, will elevate the latch plate 89 to a point which will release the previously latched jack just prior to the latching of the latch plate behind the shoulder 92 of the jack of the second key depressed. In operation, for instance, the operator depresses key numbered "3"; the depression of said key causes its connected jack 65 to be swung or shifted so that the lower rearwardly projecting terminal 69 thereof engages the front frame rail 70 and swings the rear end of the frame 36 upwardly thereby closing the motor circuit. At the same time, the upper rearwardly projecting terminal 81 disposes the cam head 84 in the path of movement of the cam lugs. As soon as the motor circuit is closed the motor starts and rotates the drum in the direction indicated by the arrows so that the cam lugs engage the cam head 84, thereby rocking the lever 83 and its depending finger 85 rearwardly to swing the rear portion of the frame 61 downwardly while the cam lug and cam head are in engagement. This causes a distance signal from each signaling element or annunciator 44. At this point on the periphery of the drum there will be three cam lugs so that three successive closings of the signal circuit will send forth from the annunciators three signals upon each rotation of the drum. The automatic stop mechanism may be set for one or more rotations prior to the depression of number "3" key or said automatic stop means may be rendered neutral as heretofore explained, in which event when the signal has been repeated the desired number of times, the stop key 130 will be depressed.

In order to provide means for covering or housing the drum, motor switches, jacks, and other mechanism, a covering hood 160 is hinged at 161 to the rear wall 162, which wall in turn is attached to the base 10, and said covering hood is provided with a cut-out portion to accommodate and permit the forward ends of the key levers to extend therethrough for manipulation. The forwardly projecting portions of the key levers preferably extend through slots 163 in a stationary front covering plate 164 attached to the base.

In order to gage the setting of the automatic stop mechanism, an indicator or pointer terminal 165 of a lever 166 extends through a slot 167 in a dial plate 168, which is provided with indicia 169. The lever 166 is fulcrumed upon the cross rod 95 and is connected by a link 170 with the lever 120.

From the foregoing it will thus be seen that a highly efficient yet comparatively simple and inexpensive signaling apparatus has been devised for the purpose set forth, and while there has been illustrated and described a preferred embodiment of the invention no limitation is necessarily made to the precise structural details as it is to be understood that variations and modifications which properly fall within the scope of the appended claims may be resorted to when found expedient.

What is claimed is:

1. In an electric signaling system, manually controlled mechanism for closing a normally open circuit closer, said mechanism comprising a normally inactive rockable member adapted when rocked to engage and close the circuit closer, a normally inactive rotary drum, an electric motor operatively connected with said drum, a motor circuit including said motor and a normally open switch, a normally inactive rockable member adapted when rocked to close the motor circuit switch for rotating the drum, a plurality of pivoted jacks each having a terminal disposed in juxtaposition to the rockable member for closing the motor circuit when the jack is actuated, each of said jacks having a second terminal, a rockable arm on said second terminal, having a cam head, and an actuating tail piece, a plurality of sets of cam lugs on the drum periphery corresponding to the number of jacks, and manually operable keys connected with the jacks for selectively rocking the same to an active position whereby to initially engage the first-mentioned jack terminal with the rockable member to close the motor circuit and rotate the drum and to dispose the cam head of the rockable arm of the second terminal of the jack in the path of movement of the corresponding set of cam lugs for causing the tail piece of said arm to be rocked and to impart rocking motion to the rockable member for closing the circuit closer of the signaling circuit.

2. In an electric signaling system, manually controlled mechanism for closing a normally open circuit closer, said mechanism comprising a normally inactive rockable member adapted when rocked to engage and close the circuit closer, a normally inactive rotary drum, an electric motor operatively connected with said drum, a motor circuit including said motor and a normally open switch, a normally inactive rockable member adapted when rocked to close the motor circuit switch for rotating the drum, a plurality of pivoted jacks each having a terminal disposed in juxtaposition to the rockable member for closing the motor circuit when the jack is actuated, manually operable keys connected with the jacks for selectively rocking the same to an active position, each of said jacks having a second terminal, a rockable arm on said second terminal, having a cam head and an actuating tail piece, a plurality of sets of cam lugs on the drum periphery corresponding to the number of jacks, and a latch means engageable with the actuated jack for holding the same in actuated position until released whereby repetition of the signals is obtained.

3. In an electric signaling system, manually controlled mechanism, for closing a normally open circuit closer, said mechanism comprising a normally inactive rockable member adapted when rocked to engage and close the circuit closer, a normally inactive rotary drum, an electric motor operatively connected with said drum, a motor circuit including said motor and a normally open switch, a normally inactive rockable member adapted when rocked to close the motor circuit switch for rotating the drum, a plurality of pivoted jacks each having a terminal disposed in juxtaposition to the rockable member for closing the motor circuit when the jack is actuated, manually operable keys connected with the jacks for selectively rocking the same to an active position, each of said jacks having a second terminal, a rockable arm on said second terminal, having a cam head and an actuating tail piece, a plurality of sets of cam lugs on the drum periphery corresponding to the number of jacks, latch means engageable with the actuated jack for holding the same in actuated position until released whereby repetition of the signals is obtained, and means for releasing the latch to stop the motor after a complete rotation of the drum.

4. In an electric signaling system, manually controlled mechanism for closing a normally open circuit closer, said mechanism comprising a normally inactive rockable member adapted when rocked to engage and close the circuit closer, a normally inactive rotary drum, an electric motor operatively connected with said drum, a motor circuit including said motor and a normally open switch, a normally inactive rockable member adapted when rocked to close the motor circuit switch for rotating the drum, a plurality of pivoted jacks each having a terminal disposed in juxtaposition to the rockable member for closing the motor circuit when the jack is actuated, manually operable keys connected with the jacks for selectively rocking the same to an active position, each of said jacks having a second terminal, a rockable arm on said second terminal, having a cam head and an actuating tail piece, a plurality of sets of cam lugs on the drum periphery corresponding to the number of jacks, latch means engageable with the actuated jack for holding the same in actuated position until released whereby repetition of the signals is obtained, and means for releasing the latch to stop the motor after a complete rotation of the drum, said means comprising a stop cam lug on the drum, a stop key, a jack connected with the stop key, and means on said jack when actuated by said key, engageable by the stop lug for releasing the latch.

5. In an electric signaling system, manually controlled mechanism for closing a normally open circuit closer, said mechanism comprising a normally inactive rockable member adapted when rocked to engage and close the circuit closer, a normally inactive rotary drum, an electric motor operatively connected with said drum, a motor circuit including said motor and a normally open switch, a normally inactive rockable member adapted when rocked to close the motor circuit switch for rotating the drum, a plurality of pivoted jacks each having a terminal disposed in juxtaposition to the rockable member for closing the motor circuit when the jack is actuated, manually operable keys connected with the jacks for selectively rocking the same to an active position, each of said jacks having a second terminal, a rockable arm on said second terminal having a cam head and an actuating tail piece, a plurality of sets of cam lugs on the drum periphery corresponding to the number of jacks, latch means engageable with the actuated jack for holding the same in actuated position until released whereby repetition of the signals is obtained, and means for instantly releasing the latch manually and rendering the signaling system inactive.

6. In an electric signaling system, manually controlled mechanism for closing a normally open circuit closer, said mechanism comprising a normally inactive rockable member adapted when rocked to engage and close the circuit closer, a normally inactive rotary drum, an electric motor operatively connected with said drum, a motor circuit including said motor and a normally open switch, a normally inactive rockable member adapted when rocked to close the motor circuit switch for rotating the drum, a plurality of pivoted jacks each having a terminal disposed in juxtaposition to the rockable member for closing the motor circuit when the jack is actuated, manually operable keys connected with the jacks for selectively rocking the same to an active position, each of said jacks having a second terminal, a rockable arm on said second terminal having a cam head and an actuating tail piece, a plurality of sets of cam lugs on the drum periphery corresponding to the number of jacks, latch means engageable with the actuated jack for holding the same in actuated position until released whereby repetition of the signals is obtained, and automatic means for releasing said latch after a predetermined number of revolutions of the rotary member.

7. In an electric signaling system, manually controlled mechanism for closing a normally open circuit closer, said mechanism comprising a normally inactive rockable member adapted when rocked to engage and close the circuit closer, a normally inactive rotary drum, an electric motor operatively connected with said drum, a motor circuit including said motor and a normally open switch, a normally inactive rockable member adapted when rocked to close the motor switch for rotating the drum, a plurality of pivoted jacks each having a terminal disposed in juxtaposition to the rockable member for closing the motor switch when the jack is actuated, manually operable keys connected with the jacks for selectively rocking the same to an active position, each of said jacks having a second terminal, a rockable arm on said second terminal, having a cam head and an actuating tail piece, a plurality of sets of cam lugs on the drum periphery corresponding to the number of jacks, latch means engageable with the actuated jack for holding the same in actuated position until released whereby repetition of the signals is obtained, and variable automatic means for releasing said latch after a predetermined number of revolutions of the rotary member.

8. In a call signaling apparatus, including a signal circuit having a normally open switch in said circuit, mechanism for closing said switch comprising a pivoted frame engageable with the switch for closing the same, pivoted key-actuated jacks, frame-actuating elements pivoted on the jacks and having cam heads, a rotary drum having axially spaced differentiated sets of circumferential cam lugs, a motor operatively connected with the drum for turning the same, a motor circuit including said motor and a normally open switch, a second pivoted frame engageable with said latter switch and operable by the jacks when shifted to close the motor circuit, and latch means for holding the jacks shifted to cause continuous rotation of the drum and to dispose the cam heads in the path of movement of the circumferential set of lugs corresponding to the arrangement of the shifted jack, whereby the elements pivoted on the jack rocks the frame and closes the signaling circuit a predetermined number of times in accordance with the number of cam lugs in the set corresponding to the shifted jack.

9. In a call signaling system having a signal circuit including a signaling device and a normally open switch, mechanism for closing said switch comprising a pivoted frame engageable with the switch for closing the same, pivoted key-actuated jacks, frame-actuating elements pivoted on the jacks and having cam heads, a rotary drum having axially spaced differentiated sets of circumferential cam lugs, a motor operatively connected with the drum for turning the same, a motor circuit including said motor and a normally open switch, a second pivoted frame engageable with said latter switch and operable by the jacks when shifted to close the motor circuit, latch means for holding the jacks shifted to cause continuous rotation of the drum and to dispose the cam heads in the path of movement of the circumferential set of lugs corresponding to the arrangement of the shifted jack, whereby the elements pivoted on the jack rocks the frame and closes the signaling circuit a predetermined number of times in accordance with the number of cam lugs in the set corresponding to the shifted jack, and drum-operated latch-releasing device for rendering the device inoperative after a predetermined number of revolutions, and means for adjusting said device to respectively predetermine the number of revolutions and to render the device inoperative to permit of a continuous rotation of the drum.

10. In a call signaling system having a signal circuit including a signaling device and a normally open switch, mechanism for closing said switch comprising a pivoted frame engageable with the switch for closing the same, pivoted key-actuated jacks, frame-actuating elements pivoted on the jacks and having cam heads, a rotary drum having axially spaced differentiated sets of circumferential cam lugs, a motor operatively connected with the drum for turning the same, a motor circuit including said motor and a normally open switch, a second pivoted frame engageable with said latter switch and operable by the jacks when shifted to close the motor circuit, latch means for holding the jacks shifted to cause continuous rotation of the drum and to dispose the cam heads in the path of movement of the circumferential set of lugs corresponding to the arrangement of the shifted jack, whereby the element pivoted on the jacks rocks the frame and closes the signal circuit a predetermined number of times in accordance with the number of cam lugs in the set corresponding to the shifted jack, drum-operated latch-releasing device for rendering the device inoperative after a predetermined number of revolutions, means for adjusting said device to respectively predetermine the number of revolutions and to render the device inoperative to permit of a continuous rotation of the drum, and a key-actuated manual stopping means for use when the drum-operated means is inactive.

11. An annunciator comprising a rotatable drum, a plurality of actuating devices and arranged in series to produce distinctive signals, a plurality of key bars each having means adapted to co-operate with the devices in one of said series to give a signal, a trigger adapted to hold any one of said keys in operative position and thereby repeat the distinctive signals and means to release the trigger at the end of a signal, said means comprising a key bar, means on said key bar cooperating with the trigger to hold the key bar in operative position, an actuating device positioned on the drum in a position at the end of a distinctive signal and a stop actuated by the key bar and brought thereby into position to be engaged by said actuating device, said stop engaging with said trigger and being moved by said actuating device to release the trigger.

JACOB GULLONG.